Feb. 14, 1950 J. HAUMANN 2,497,219
VENDING MACHINE
Filed March 24, 1948 8 Sheets-Sheet 1
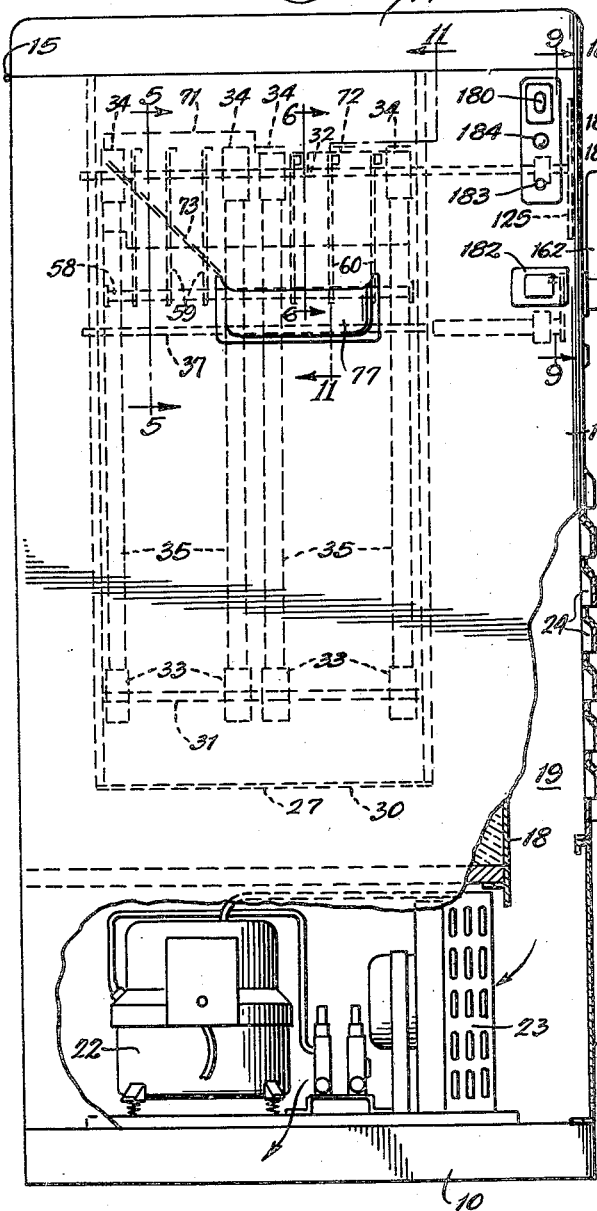
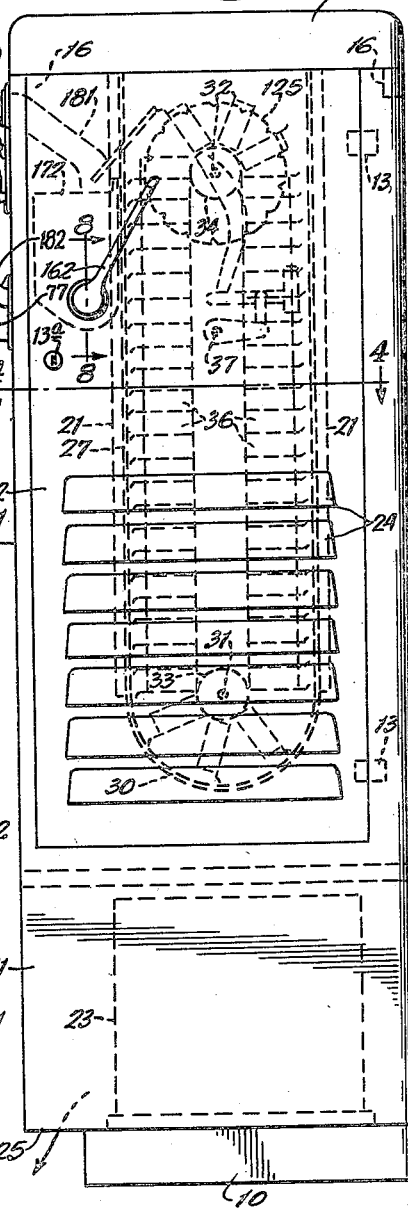
Inventor:
Joseph Haumann,
By Dawson, Ooms, Booth and Spangenburg
Attorneys.

Feb. 14, 1950 J. HAUMANN 2,497,219
VENDING MACHINE
Filed March 24, 1948 8 Sheets-Sheet 2
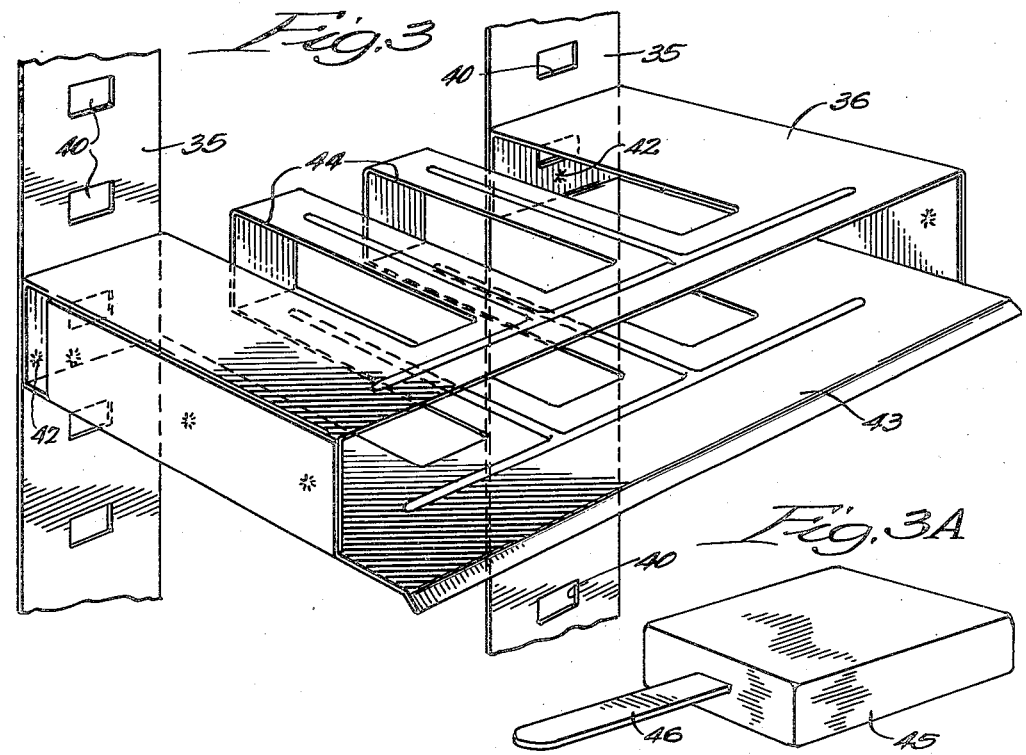
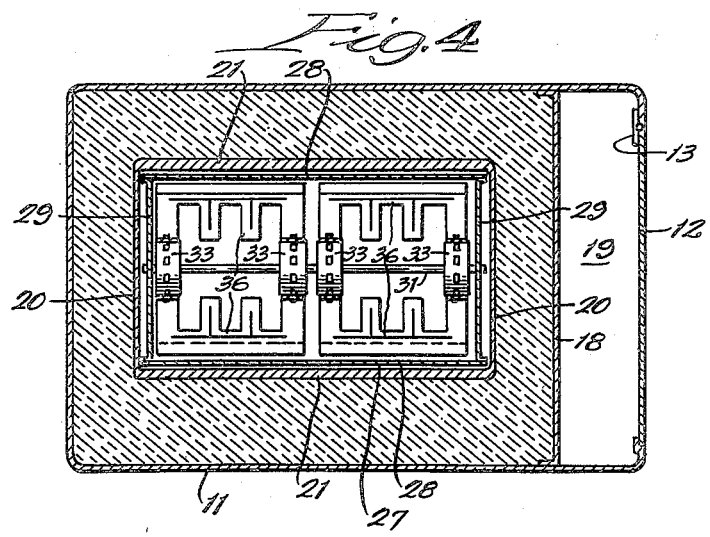
Inventor:
Joseph Haumann,
By Dawson, Ooms, Bortle & Spangenberg,
Attorneys.

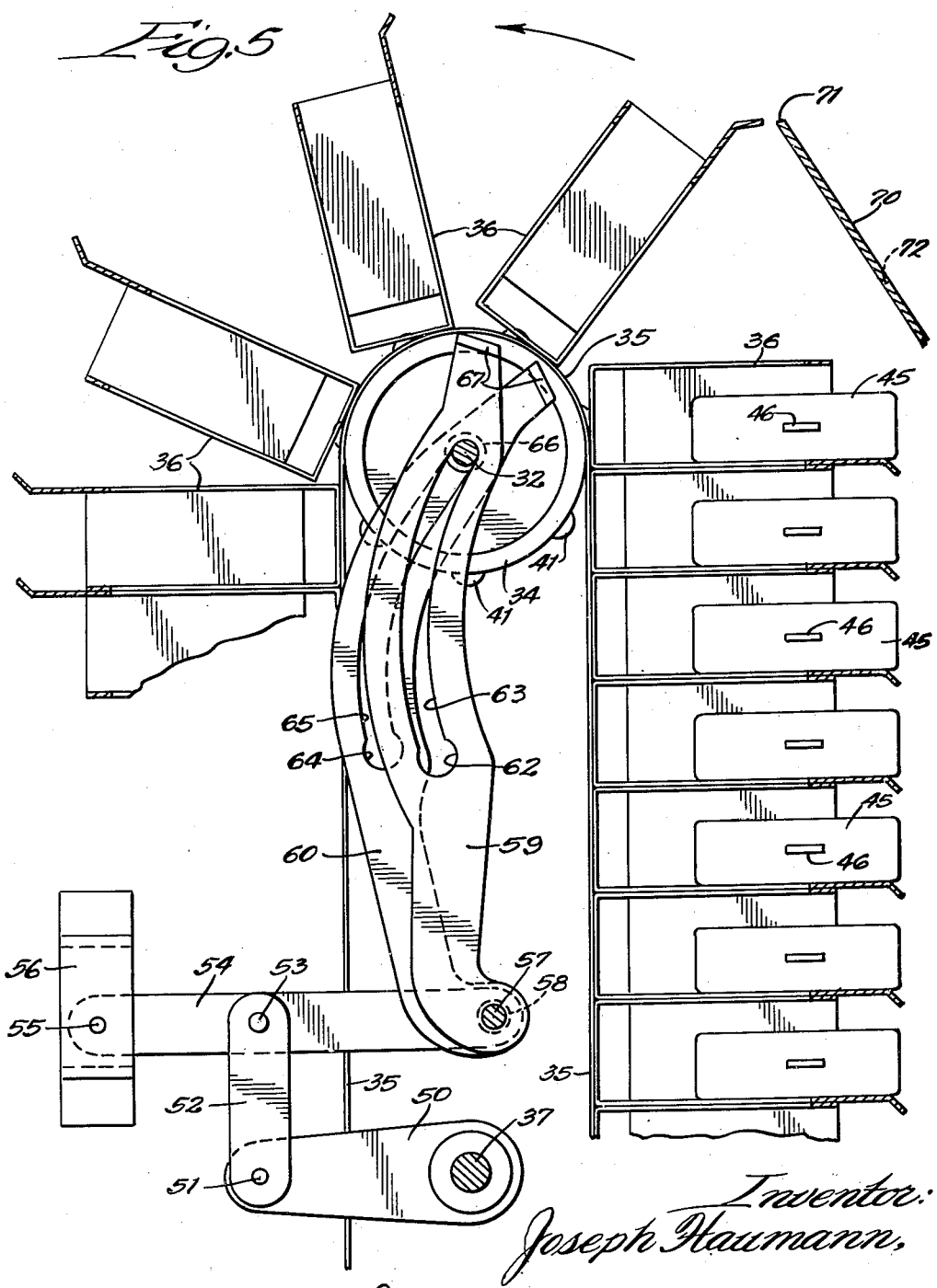

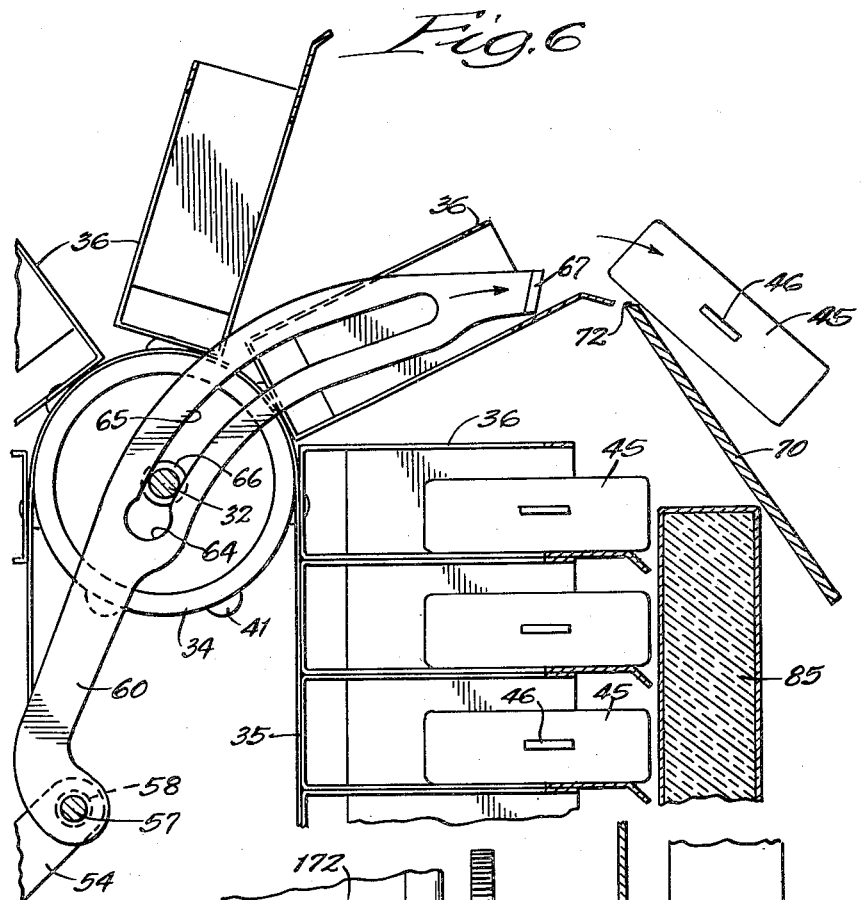
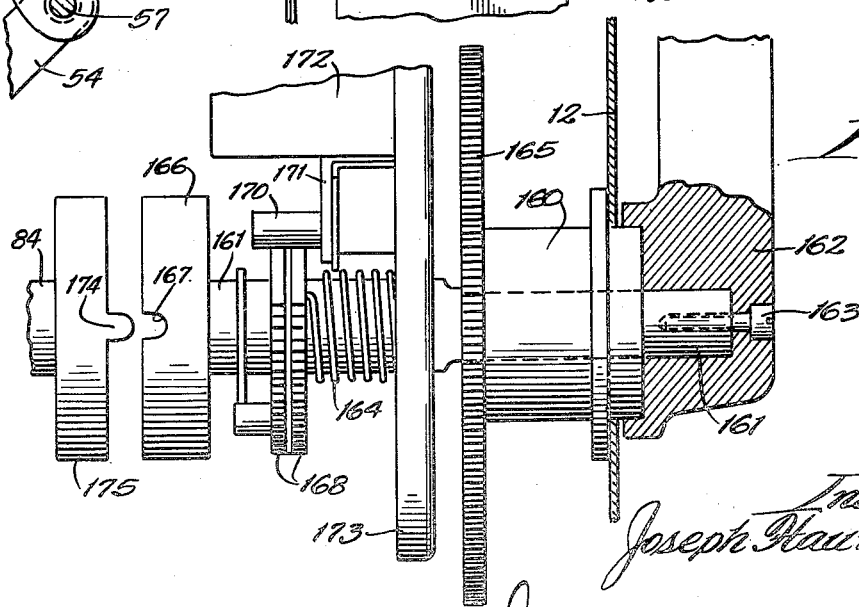

Feb. 14, 1950 J. HAUMANN 2,497,219
VENDING MACHINE
Filed March 24, 1948 8 Sheets-Sheet 5
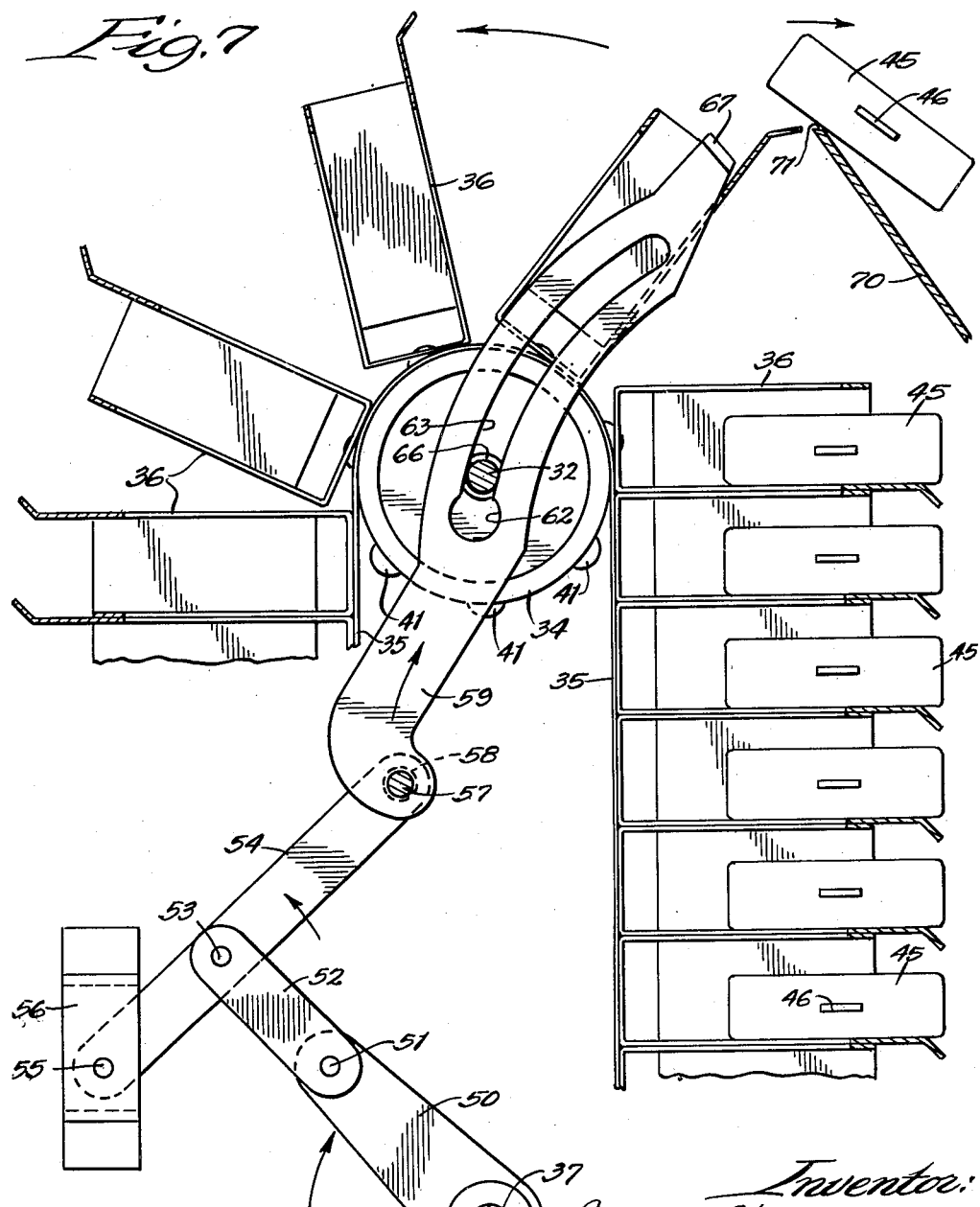

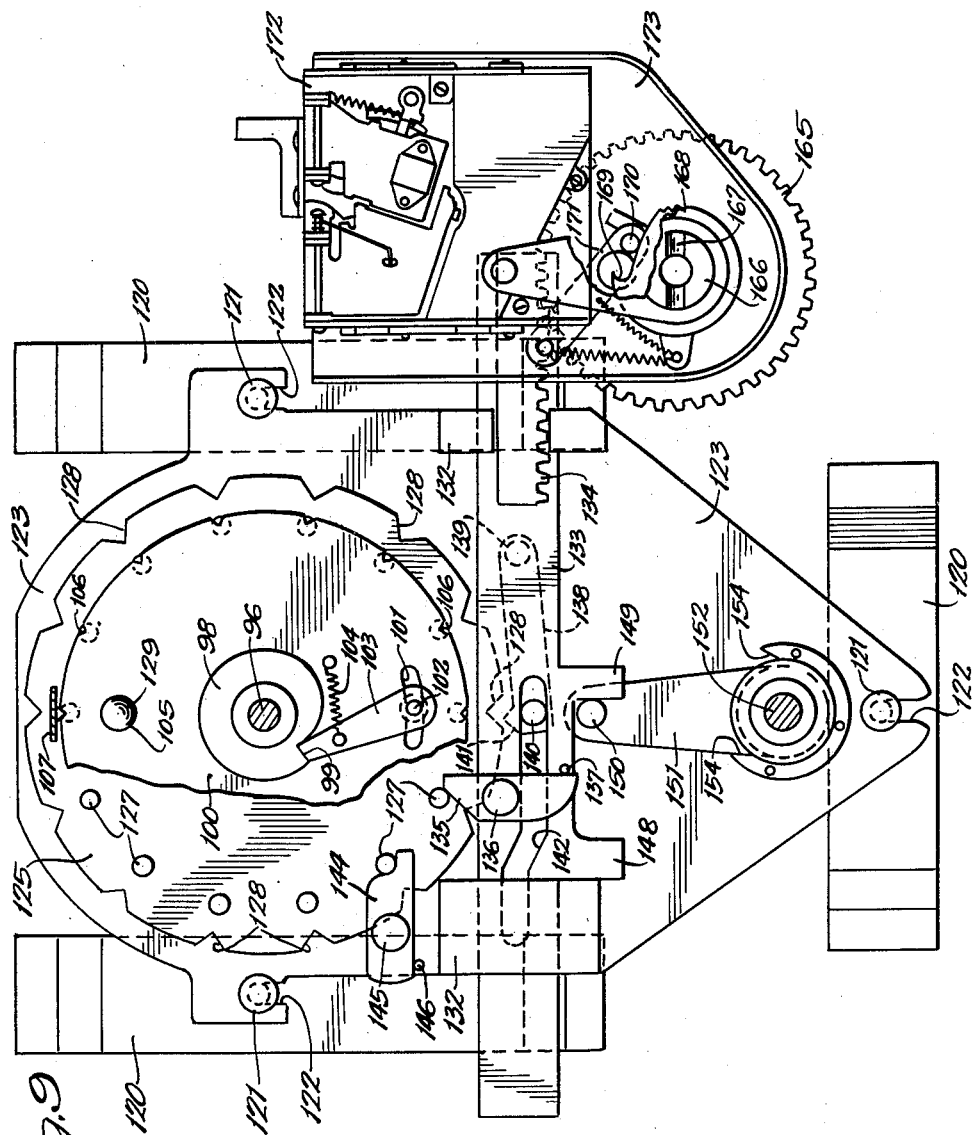

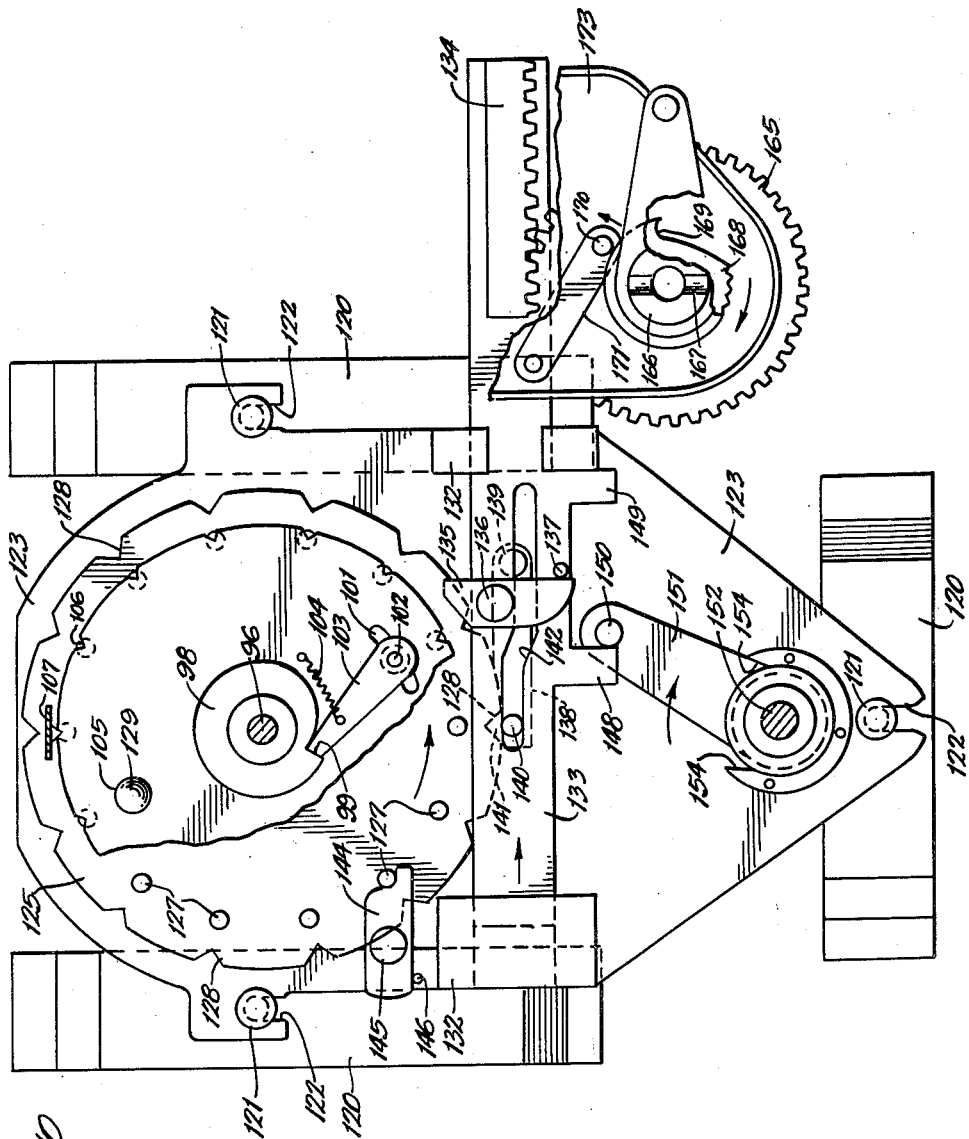

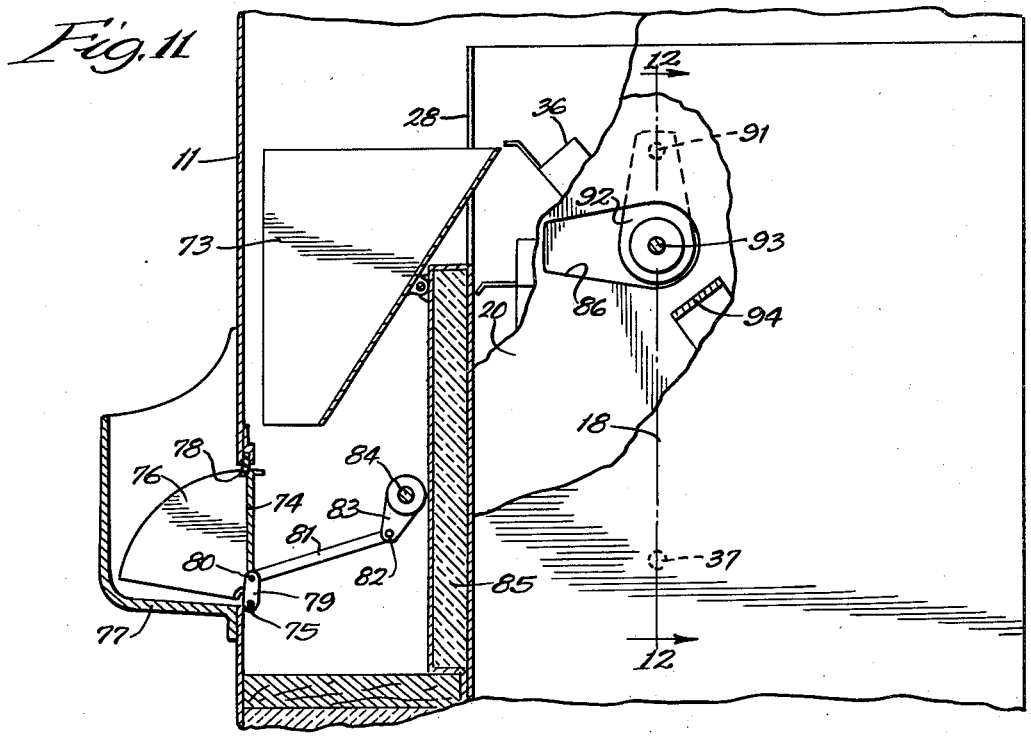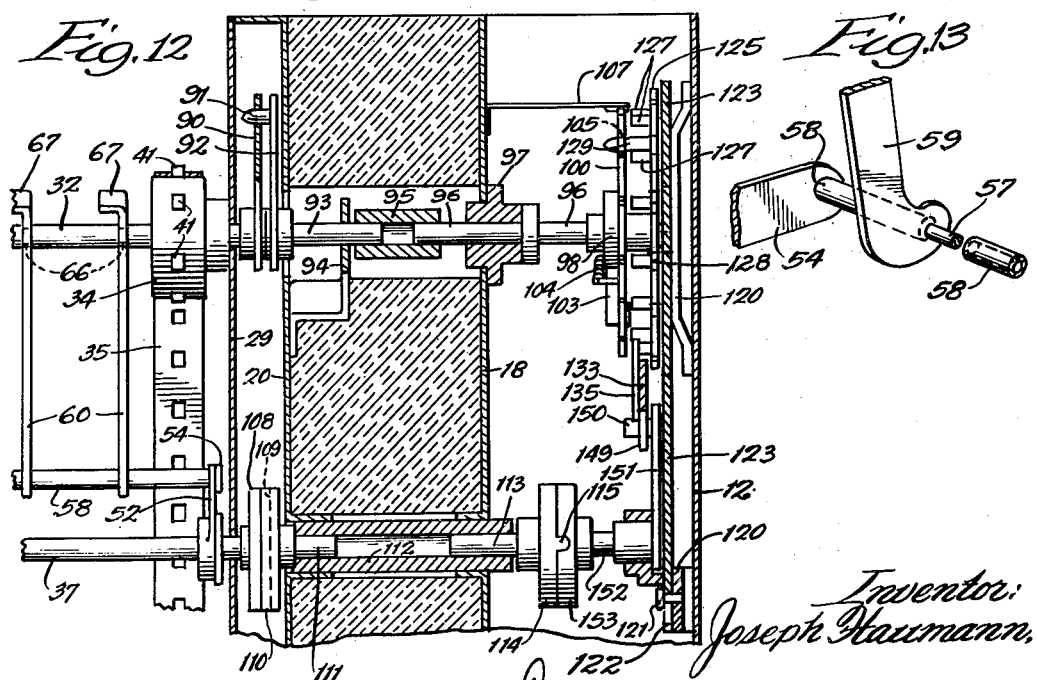

Patented Feb. 14, 1950

2,497,219

UNITED STATES PATENT OFFICE 2,497,219

VENDING MACHINE

Joseph Haumann, Chicago, Ill., assignor, by mesne assignments, to Dresko Machine Corporation, Chicago, Ill., a corporation of Delaware Application March 24, 1948, Serial No. 16,659

12 Claims. (Cl. 312—97)

This invention is directed to vending machines and more particularly to one adapted to vend frozen articles such as ice cream bars and the like.

The principal object of this invention is to provide an improved vending machine for vending articles such as ice cream bars and the like, wherein a relatively large number of articles are efficiently retained in a refrigerated condition in a storage compartment of small size, wherein the refrigerated articles are dispensed from the storage compartment one at a time preferably, under the control of a coin controlled mechanism, wherein the operating parts are readily accessible for cleaning, repair, adjustment and servicing, wherein condensation of moisture on the operating parts and consequent freezing thereof are eliminated, and which may be readily and inexpensively manufactured, assembled and serviced.

Other objects and advantages will become apparent to those skilled in the art upon reference to the accompanying specification, claims and drawings in which:

Figure 1 is a front elevational view partially in section of the vending machine of this invention;

Figure 2 is a side elevational view looking from the right of Fig. 1;

Figure 3 is a perspective view of one of the article receiving pockets of the conveyor;

Figure 3A is a perspective view of an article such as an ice cream bar to be dispensed by the machine;

Figure 4 is a horizontal sectional view taken substantially along the line 4—4 of Fig. 2;

Figure 5 is an enlarged partial sectional view taken substantially along the line 5—5 of Fig. 1;

Figure 6 is a sectional view similar to Fig. 5, but taken along the line 6—6 of Fig. 1;

Figure 7 is a sectional view similar to Fig. 5, but showing the parts in a different position;

Figure 8 is a sectional view taken substantially along the line 8—8 of Fig. 2;

Figure 9 is a sectional view taken substantially along the line 9—9 of Fig. 1;

Figure 10 is a view similar to Fig. 9, but showing the parts in a different position;

Figure 11 is a sectional view taken substantially along the line 11—11 of Fig. 1;

Figure 12 is a vertical sectional view taken substantially along the line 12—12 of Fig. 11, and Figure 13 is a partial perspective view of a detail illustrated in Fig. 5.

Referring first to Figs. 1, 2 and 4, the vending machine includes a housing having a base 10 and an outer casing 11. One side wall of the outer casing is provided with a door 12 hinged thereto by hinges 13 and locked in place by a suitable lock 13a. The housing is provided with a cover 14 having a thick layer of thermal insulating material therein which is hinged in place on the housing by a hinge 15 and is held in a closed position by latches 16 accessible from within the housing when the door 12 is opened.

The right side of the housing is provided with a partition 18 to define a space 19 between the partition and the door 12 for the operating mechanism of the vending machine.

The housing is, also, provided with an inner casing 20, the front and rear walls of which are formed of evaporator plates 21 for refrigerating the interior of the inner casing. The space between the inner casing 20 and the outer casing 11 is filled with thermal insulating material so that refrigerated articles may be maintained within the inner casing 20 with the greatest possible efficiency. The evaporator plates 21 are connected to a conventional refrigerating apparatus located in the bottom of the housing on the base 10 and this refrigerating apparatus may include the usual compressor 22, expansion valve and condensor 23. Air for condensing purposes enters through louvers 24 in the door 12 and then passes downwardly through the compartment 19 and over the condensor 23 and out thru a passage 25 adjacent the base 10. The compressor of the refrigerating apparatus may be thermostatically controlled in a conventional manner for maintaining the desired refrigerating temperatures within the inner casing 20.

A storage compartment 27 is removably received within the inner casing 20 and the storage compartment may include front and rear walls 28 and side walls 29, the front and rear walls converging in a semi-cylindrical bottom wall 30. Preferably the front and rear walls 28 are located as closely as possible to the evaporators 21 so that maximum cooling efficiency is obtained. Space is preferably maintained between the side walls 29 of the storage compartment and the inner casing 20 in order that releasable connections may be included between these two members to permit removal of the storage compartment from the inner casing.

A pair of conveyor shafts 31 and 32 are journaled in the side walls 29 of the storage compartment 27 and these conveyor shafts carry wheels 34 which in turn support and carry belts 35, which in turn carry a plurality of article receiving pockets 36 to form a continuous conveyor. As illustrated, there are four wheels carrying two rows of article receiving pockets although the article receiving pockets may be supported by a lesser number of wheels. The various article receiving pockets 36 of the two rows of pockets are in alinement with each other. The side walls 29 of the storage compartment also rotatably support an ejector operating shaft 37.

Referring now in more detail to Figs. 3, 5, 6 and 7, the belts 35 are provided with a plurality of holes 40 which are adapted to receive projections 41 on the periphery of the wheels 34 so that upon rotation of the wheels 34 a positive drive is provided for advancing the belts 35 and the pockets carried thereby. The pockets 36 are formed of light weight sheet metal and are spot welded to the belts 35 which are formed of flexible sheet metal. Preferably the spot welded connection is made adjacent the bottom of the pockets so that the pockets may flex with respect to the belts as indicated in Figs. 5, 6 and 7. The pockets are preferably provided with ledges 43 which closely approach the front and rear walls and the bottom wall of the storage compartment to prevent articles from falling from the pockets. The rear pockets are also provided with a plurality of openings 44 which, as will be pointed out in more detail hereafter, are adapted to receive ejectors for ejecting articles from the pockets.

The articles vended by the machine of this invention may be of any type, but preferably they are ice cream bars such as illustrated at 45 in Fig. 3A and which may be provided with suitable sticks 46. The pockets are of such size as to receive the articles to be vended.

Adjacent each side wall 29 of the storage compartment the ejector operating shaft 37 carries a crank 50 which is connected by a pin to one end of a link 52, the other end of which is connected by a pin 53 to a lever 54 pivoted at 55 to a bracket 56 secured to the side wall 29 of the storage compartment. The crank 50 and the link 52 form a toggle for oscillating the lever 54 about its pivot 55. The outer end of each lever 54 is secured to a shaft 57. A plurality of ejectors are carried by the shaft 57 and are held in spaced relation by spacer sleeves 58 as shown in more detail in Fig. 13. The ejector 59 operates to eject articles from one row of pockets at a relatively high elevation and the ejector 60 operates to eject articles from the other row of pockets at a relatively low elevation as will be seen by comparing Figures 6 and 7. To this end the ejector 59 is provided with a hole 62 and a communicating arcuate slot 63 and likewise the ejector 60 is provided with a corresponding hole 64 and a communicating slot 65. The ejectors 59 and 60 in the assembly of the machine are adapted to be slid over the upper conveyor shaft 32, this being permitted by the enlarged holes 62 and 64. The upper conveyor shaft 32 is provided with a plurality of longitudinally spaced peripherial grooves 66 for receiving the arcuate slots 63 and 65 of the ejectors. When the ejectors are properly located the slots 63 and 65 are received in the grooves so that the ejectors are properly positioned and carried by the upper conveyor shaft 32 and the shaft 57. The upper ends of each ejector 59 and 60 have pusher surfaces 67 which enter in the openings 44 in the pockets 36 for ejecting articles therefrom.

The vending machine includes a discharge passage having bottomwall 70 which terminates at a high elevation 71 with respect to one row of pockets and at a low elevation 72 with respect to the other row of pockets. The discharge passage also has side walls 73 for directing the ejected articles to a door 74 carried for pivotal movement by a shaft 75. The door has side walls 76 and connects with a discharge tray 77 carried on the outer surface of the housing. A sealing gasket seals the door when the door is closed.

The door is opened during the time that articles are discharged through the discharge passage. The shaft 75 which carries the door 74 is provided with a crank arm 79 which is pivoted at 80 to one end of a link 81, the other end of which is pivoted at 82 to a crank 83 carried by a shaft 84. Thus, when the shaft 84 is rotated the door 74 is opened and closed. Preferably there is provided a strip of insulating material 84 adjacent the door and operating mechanism therefor to prevent the operating mechanism and door from becoming so cold as to condense and freeze moisture thereon.

Referring now to Figs. 5, 6, 7 and 11, Figs. 5 and 6 illustrate the positions of the parts of the conveyor, ejectors and door for the discharge passage when the vending machine is at rest. When it is desired to vend an article a mechanism described in more detail hereafter operates these parts in timed relation. In the cycle of operation the door 74 is opened and the conveyor is advanced a distance equal to one half the distance between the pockets 36 to the position illustrated in Fig. 6 wherein the adjacent pockets of the two rows of pockets line up with the lower edge 72 of the discharge passage 70. The ejectors 59 and 60 are operated from the position shown in Fig. 5 to the positions shown in Figs. 6 and 7. Under these conditions the ejector 60 operates to eject an article from its associated pocket over the edge 72 into the discharge passage 70 and out through the door 74 into the discharge tray 77. The ejector 59 has no effect at this time for it extends above the article in its associated pocket. The door is then closed and the ejectors returned to the position illustrated in Fig. 5 while the conveyor remains in the position illustrated in Fig. 6. The vending machine is again at rest until another article is to be ejected therefrom.

Upon the next operation of the machine the door 74 is opened, the conveyor is advanced one half the distance between the pockets from the position shown in Fig. 6 to the position shown in Fig. 7 and then the ejectors 59 and 60 are advanced. In the latter position of the conveyor the pockets line up with the upper edge 71 of the discharge passage 70. The ejector 59 urges the article from its associated passage over the upper edge 71 into the discharge passage 70 and out through the door 74 into the discharge tray 77. At this time the ejector 60 has no effect since the article has previously been ejected from its associated pocket. Following this dispensing operation the ejectors are returned to the position shown in Fig. 5 and the door 74 is closed and the vending machine is again at rest. The conveyor assumes a position corresponding to the position illustrated in Fig. 5 and is ready for another cycle of operation.

Thus the vending machine includes a conveyor having two rows of alined pockets, offset discharge passages and offset ejectors. On each vending operation the ejectors and discharge passage door are fully operated and the conveyor is advanced one half the distance between the pockets to provide for dispensing one article at a time from the alined pockets of the two rows of pockets. This action permits the storage of a maximum number of articles in a minimum storage space.

The upper conveyor shaft 32 journaled in the compartment 27 extends outwardly beyond the wall 29 thereof and is provided with a crank arm 90 having a hole therein for receiving a pin 91 carried by a crank arm 92 which in turn is carried by a shaft 93. The shaft 93 is journaled in a bracket 94 and is connected by a sleeve 95 made of thermal insulating material to a shaft 96 journaled at 97. The sleeve 95 of thermal insulating material operates to decrease materially the transfer of heat between shafts 96 and 93 so that the parts of the mechanism's exterior of the shaft 96 will not condense and freeze moisture thereon. The inner casing 20 is provided with an enlarged opening 86 through which the crank arm 92 may be retracted when brought in alinement therewith. Thus, the pin 91 may be withdrawn from the hole in the crank arm 90 to permit upward removal of the storage compartment 27 when desired.

The outer end of the shaft has secured to it a latch collar 98 having a latch surface 99 and a disc 100 is rotatably mounted on the shaft 96 adjacent the latch collar 98. The disc 100 is provided with a circumferential slot 101 for adjustably receiving a pivot pin 102 carrying a latch arm 103 which is urged against the latch collar 98 by a spring 104. When the disc 100 is rotated in a clockwise direction as illustrated in Figs. 9 and 10, the latch lever 103 engages the latch surface 99 of the collar 98 to rotate the shaft 96 and hence advance the conveyor. The conveyor may be manually advanced with respect to the disc 100 for loading purposes, this being permitted by the one-way connection afforded by the latch collar 98 and latch lever 103. The latch lever 103 may be adjustably positioned in the slot 101 for alining the positions of the conveyor and the disc 100. The disc 100 is also provided with a hole 105 and with notches 106 on the periphery thereof to cooperate with an index 107 mounted on the partition 18. The notches may have indicia associated therewith so that the position of the conveyor in the storage compartment may be visually determined by reference to the position of the disc 100.

The ejector operating shaft 37 journaled in the storage compartment 27 also extends beyond the side wall 29 and carries a disc 108 provided with a tongue 109 which is received in a groove of a complimentary disc 110 carried by a shaft 111. When the ejectors are in the retracted position as illustrated in Fig. 5 the tongue and groove of the discs 108 and 109 are vertically arranged. Thus, when the crank arm 92 associated with the conveyor shaft is retracted through the opening 86, the storage compartment with the parts carried thereby may be freely lifted from the inner casing 20. The shaft 111 is connected by a sleeve 112 of thermal insulating material to a shaft 113 which carries a disc 114 provided with a tongue 115. The sleeve 112 of thermal insulating material greatly reduced the conduction of heat by the shafts 113 and 111 to prevent condensation and freezing of moisture on the exterior of the shaft 113.

Referring now more particularly to Figs. 9, 10 and 12, the door 12 is provided with three brackets 120 carrying headed pins 121, for receiving slots 122 of a supporting plate 123. The plate 123 and various parts carried thereby are, therefore, removably supported by the door 12. A ratchet wheel 125 in the form of a disc is rotatably mounted on the plate 123. The disc 125 is provided with a plurality of circumferentially arranged pins 127 and a plurality of peripheral notches 128 in radial alinement with the pins 127. The disc 125 also carried a pin 219 to be received in the hole 105 of the disc 100 when the door 12 is closed. Thus, rotation of the disc 125 is transmitted through the pin 129 to the disc 100 and through the latch lever 103 to the collar 98 and through the crank arm 92 and pin 91 to the crank arm 90 for advancing the conveyor. The distance between the pins 127 corresponds to one-half the distance between the pockets of the conveyor. The pin 129 on the disc 125 and the hole 105 in the disc 100 affords a releasable connection between the two discs, the connection being released when the door 12 is opened.

The supporting plate 123 carries a pair of brackets 132 for slidably receiving a member 133 which in turn carries a rack 134. A pawl 135 is pivoted at 136 to the member 133 and is urged by a spring into engagement with a stop pin 137. The pawl 135 cooperates with the pins 127 on the disc 125 for rotating the disc.

A lever 138 is pivoted at 139 to the supporting plate 123 and carries a pin 140 and is provided with a cam surface 141 adapted to enter the notches 128 in the periphery of the disc 125. The pin 140 rides in a cam slot 142 in the member 133. The cam slot 142 therefore operates to push the cam surface 141 of the lever 138 in the peripherial notches 128 for accurately alining the position of the rachet wheel disc 125.

A pawl 144 is pivoted to the supporting plate 123 at 145 and a spring normally urges the pawl into engagement with a stop pin 146.

The member 133 also carries a pair of spaced abutments 148 and 149 which are adapted to engage a pin 150 carried by a crank arm 151 which in turn is carried by a shaft 152 journaled on the supporting plate 123. The shaft 152 carries a disc 153 provided with a groove for receiving the tongue 115 of the disc 114. Thus, the crank 151 is connected to the ejector operating shaft 137 by a releasable connection afforded by the tongue and groove. When the door 12 is open the connection is released and when the door 12 is closed it is remade. Stops 154 associated with the crank arm 151 limit the extent of movement of the crank arm.

With the parts in the position shown in Fig. 9 the vending machine is at rest and backward movement of the conveyor is prevented by the pawl 144 engaging a pin 127. When the member 133 is slidably advanced towards the right as illustrated in Fig. 9, the pawl 135 engages a pin 127 and rotates the ratchet wheel disc 125 a distance corresponding to the distance between pins 127. After the disc 125 has thus been advanced the cam slot 142 operates on continued movement of the member 133 to engage the cam surface 141 in a peripherial notch 128 for accurately alining the disc 135 as is illustrated in Fig. 10. When the disc 125 is thus advanced and alined the pawl 144 engages a pin 127 to prevent reverse movement of the disc 125. Towards the end of the movement of the member 133 the abutment 148 engages the pin 152 to move the crank arm 151 to the position shown in Fig. 10 whereby the ejectors in the storage compartment are operated. Upon retraction of the member 133 to the left from the position shown in Fig. 10 to the position shown in Fig. 9 the cam surface 141 is withdrawn from the peripherial notch 128 and the pawl 135 slides over the pin 127 for resetting the mechanism for the next cycle of operation. Towards the end of the retracting movement of member 133 the abutment 149 engages the pin 150 of the crank arm 151 to return the crank arm to the position shown in Fig. 9 whereby the ejectors are returned to the position shown in Fig. 5. The parts are then restored to the position shown in Fig. 9 and ready for another cycle of operation.

The door 12 as illustrated in Fig. 8 carries a bearing 160 for rotatably receiving the shaft 161. The outer end of the shaft 161 is provided with a handle 162 held in place thereon by a screw 163. The shaft 161 is also provided with a spring 164 for retaining the handle 162 in a vertical position. The shaft 161 carries a gear 165 which meshes with the rack 134 of the member 133 so that when the handle 162 is pulled the member 133 is advanced and when the door 162 is released, the spring 164 operates to retract the member 133 and return the handle 162 to the vertical position. The shaft 161 carries a disc 166 provided with a groove 167 which is adapted to receive a toggle 174 of a disc 175 carried by the door operating shaft 84. The toggle and groove form a releasable connection which is released when the door is open and which is made when the door is closed. Thus, manipulation of the handle 162 operates through the releasable connection for opening and closing the door 74 of the discharge passage.

The shaft 161 carries latching wheels 168 provided with latches 169 which engage a pin 170 of a pivoted lever 171 all of which form parts of a conventional coin mechanism 172 which is mounted on a support 173 secured to the door 12. The pin 170 cooperates with the latches 169 for normally preventing rotation of the shaft 161, and hence operation of the vending machine. When, however, a suitable coin is passed through the coin mechanism 172, the coin operates to raise the pin 170 out of line with the latches 169 whereby the shaft 161 may be rotated and the vending machine operated. The mechanisms of the coin mechanism 172 may be readily removed from the support 173 when the door 12 is open. Since the coin mechanism may be a standard coin mechanism a further description thereof is not considered necessary. The front face of the housing may be provided with a coin slot 180 through which coins may be inserted and conveyed by a coin chute 181 to the coin mechanism 172 when the door 12 is closed. The front face of the housing may, also, be provided with a coin return 182 for returning coins rejected by the coin mechanism. A button 183 may, also, be provided for manually returning coins and an indicator like 184 may, also, be provided for indicating when the vending machine is empty.

While for purposes of illustration, one form of this invention has been disclosed, other forms thereof may become apparent to those skilled in the art upon reference to this disclosure, and therefore, this invention is to be limited only by the scope of the appended claims.

I claim as my invention:

1. A vending machine comprising, a storage compartment, a pair of spaced conveyor shafts journalled in the storage compartment, a continuous conveyor in the storage compartment carried by the shafts and provided with two rows of aligned article receiving pockets, offset discharge passages for the storage compartment associated respectively with the rows of pockets, offset ejectors in the storage compartment associated respectively with the rows of pockets, and mechanism connected with said conveyor and ejectors for operating said offset ejectors and advancing said conveyor one-half the distance between said pockets for alternately ejecting articles from the two rows of pockets through the associated offset discharge passages.

2. A vending machine comprising, a storage compartment, a pair of spaced conveyor shafts journalled in the storage compartment, a continuous conveyor in the storage compartment carried by the shafts and provided with two rows of aligned article receiving pockets, offset discharge passages for the storage compartment associated respectively with the rows of pockets, offset ejectors in the storage compartment associated respectively with the rows of pockets, an oscillatory shaft for operating said offset ejectors, a ratchet wheel for rotating one of the conveyor shafts to advance the conveyor, a coin controlled member including a pawl for rotating the ratchet wheel to advance the conveyor one-half the distance between said pockets, and a lost motion connection between the coin controlled member and the ejector operating shaft for operating the ejector after the conveyor has been advanced for alternately ejecting articles from the two rows of pockets through the associated offset discharge passages.

3. A vending machine comprising, a storage compartment, a pair of spaced conveyor shafts journaled in the storage compartment, a continuous conveyor in the storage compartment carried by the shafts and provided with two rows of aligned article receiving pockets, offset discharge passages for the storage compartment associated respectively with the rows of pockets, offset ejectors in the storage compartment associated respectively with the rows of pockets and slidably carried by one of the conveyor shafts, a crank for slidably operating the ejectors, an oscillatory shaft, a toggle link connection between the crank and oscillatory shaft, and mechanism connected with the conveyor and the oscillatory shaft for operating said offset ejectors and advancing said conveyor one-half the distance between said pockets for alternately ejecting articles from the two rows of pockets through the associated offset discharge passages.

4. A vending machine comprising, a storage compartment, a pair of spaced conveyor shafts journalled in the storage compartment, a continuous conveyor in the storage compartment carried by the shafts and provided with two rows of aligned article receiving pockets, offset discharge passages for the storage compartment associated respectively with the rows of pockets, offset ejectors in the storage compartment associated respectively with the rows of pockets and slidably carried by one of the conveyor shafts, a crank for slidably operating the ejectors, an oscillatory shaft, a toggle link connection between the crank and oscillatory shaft, a ratchet wheel for rotating one of the conveyor shafts to advance the conveyor, a coin controlled member including a pawl for rotating the ratchet wheel to advance the conveyor one-half the distance between said pockets, and a lost motion connection between the coin controlled member and the ejector operating shaft for operating the ejector after the conveyor has been advanced for alternately ejecting articles from the two rows of pockets through the associated offset discharge passages.

5. A vending machine comprising, a storage compartment, a pair of spaced conveyor shafts journalled in the storage compartment, a continuous conveyor in the storage compartment carried by the shafts and provided with article receiving pockets, a discharge passage for the storage compartment, an ejector in the storage compartment slidably mounted on one of the conveyor shafts and associated with the pockets for ejecting articles through the discharge passage, a crank for slidably operating the ejector, an ejector operating shaft journalled in the compartment, a toggle link connection between the crank and the ejector operating shaft, and a coin controlled mechanism connected to one of the conveyor shafts and the ejector operating shaft for advancing the conveyor and operating the ejector for ejecting articles from the pockets through the discharge passage.

6. A vending machine comprising, a storage compartment, a pair of spaced conveyor shafts journalled in the storage compartment, a continuous conveyor in the storage compartment carried by the shafts and provided with article receiving pockets, a discharge passage for the storage compartment, an ejector in the storage compartment slidably mounted on one of the conveyor shafts and associated with the pockets for ejecting articles through the discharge passage, a crank for slidably operating the ejector, an ejector operating shaft journalled in the compartment, a toggle link connection between the crank and the ejector operating shaft, a ratchet wheel for rotating one of the conveyor shafts to advance the conveyor, a coin controlled member including a pawl for rotating the ratchet wheel to advance the conveyor, and a lost motion connection between the coin controlled member and the ejector operating shaft for operating the ejector after the conveyor has been advanced for ejecting articles from the pockets through the discharge passage.

7. A vending machine for frozen articles comprising, a housing including an outer casing, an inner casing having an evaporator of a refrigerating apparatus and thermal insulating material interposed between the two casings, a cover including thermal insulating material providing access into the inner casing, a storage compartment removably received in the inner casing, a pair of spaced conveyor shafts journalled in the storage compartment, a continuous conveyor in the storage compartment carried by the shafts and provided with pockets for receiving the frozen articles, a discharge passage communicating with the storage compartment, an ejector in the storage compartment associated with the pockets for ejecting articles through the discharge passage, an ejector operating shaft journalled in the storage compartment, a pair of shafts journalled in the housing in alignment respectively with one of the conveyor shafts and the ejector operating shaft, and releasable connections between said pair of shafts and said aligned conveyor and ejector operating shafts and located between the inner casing and the storage compartment to provide for removal of the storage compartment and the parts carried thereby.

8. A vending machine for frozen articles comprising, a housing including an outer casing, an inner casing having an evaporator of a refrigerating apparatus and thermal insulating material interposed between the two casings, a cover including thermal insulating material providing access into the inner casing, a storage compartment removably received in the inner casing, a pair of spaced conveyor shafts journalled in the storage compartment, a continuous conveyor in the storage compartment carried by the shafts and provided with pockets for receiving the frozen articles, a discharge passage communicating with the storage compartment, an ejector in the storage compartment associated with the pockets for ejecting articles through the discharge passage, an ejector operating shaft journalled in the storage compartment, a pair of shafts journalled in the housing in alignment respectively with one of the conveyor shafts and the ejector operating shaft, releasable connections between said pair of shafts and said aligned conveyor and ejector operating shafts and located between the inner casing and the storage compartment to provide for removal of the storage compartment and the parts carried thereby, and mechanism carried by the housing exteriorly to the thermal insulation and connected to said pair of shafts for advancing the conveyor and operating the ejector for ejecting frozen articles from the pockets through the discharge passage.

9. A vending machine for frozen articles comprising a housing including an outer casing, an inner casing housing an evaporator of a refrigerating apparatus and thermal insulating material interposed between the two casings, a storage compartment removably received in the inner casing, a discharge passage communicating with the storage compartment, a conveyor and ejector within the storage compartment including a conveyor operating shaft and an ejector operating shaft for ejecting frozen articles through the discharge passage, mechanism carried by the housing exteriorly of the thermal insulation for operating said shafts, and connections extending through the thermal insulating material between said shafts and mechanism, said connections including thermal insulating material to prevent freezing of the mechanism and being releasable between the inner casing and storage compartment to provide for removal of the storage compartment and the parts carried thereby.

10. A vending machine comprising, a storage compartment, a pair of spaced conveyor shafts journalled in the storage compartment, a continuous conveyor in the storage compartment carried by the shafts and provided with two rows of aligned article receiving pockets, offset discharge passages for the storage compartment associated respectively with the rows of pockets, a door at the outlet of said offset discharge passages, offset ejectors in the storage compartment associated respectively with the rows of pockets, and mechanism connected with said conveyor, ejectors and door for opening said door, for operating said offset ejectors and advancing said conveyor one-half the distance between said pockets for alternately ejecting articles from the two rows of pockets through the associated offset discharge passages.

11. A vending machine comprising a conveyor provided with article receiving pockets and having an operating shaft for advancing the same, a discharge passage associated with the pockets of the conveyor, an ejector for ejecting articles from the pockets of the conveyor through the discharge passage and having an operating shaft, and a mechanism for operating said conveyor operating shaft and said ejector operating shaft including a disc connected to the conveyor operating shaft and having peripheral notches and circumferentially arranged pins, a dog adapted to enter the peripheral notches, a crank arm connected to the ejector operating shaft and a reciprocating control member having a pawl for engaging the pins to advance the disc, a cam surface for moving the dog in the peripheral notches for aligning the disc and a pair of ears providing a lost motion connection with the crank arm for operating the same.

12. A vending machine comprising a conveyor provided with article receiving pockets and having an operating shaft for advancing the same, a discharge passage associated with the pockets of the conveyor, a door for the discharge passage and having an operating shaft, an ejector for ejecting articles from the pockets of the conveyor through the discharge passage and having an operating shaft, and a mechanism for operating said conveyor operating shaft, door operating shaft and ejector operating shaft including a disc connected to the conveyor operating shaft and having peripheral notches and circumferentially arranged pins, a dog adapted to enter the peripheral notches, a crank arm connected to the ejector operating shaft and a reciprocating control member having a pawl for engaging the pins to advance the disc, a cam surface for moving the dog in the peripheral notches for aligning the disc and a pair of ears providing a lost motion connection with the crank arm for operating the same.

JOSEPH HAUMANN.

REFERENCES CITED

The following references are of record in the file of this patent:

UNITED STATES PATENTS

| Number | Name | Date |
|---|---|---|
| 1,509,249 | Miles et al. | Sept. 23, 1924 |
| 1,926,662 | Antoine et al. | Sept. 12, 1933 |
| 1,946,078 | Kelley | Feb. 6, 1934 |
| 2,222,862 | Tratsch | Nov. 26, 1940 |
| 2,281,191 | Eddy et al. | Apr. 28, 1942 |

FOREIGN PATENTS

| Number | Country | Date |
|---|---|---|
| 489,277 | Great Britain | Apr. 28, 1942 |